United States Patent [19]

Matsue et al.

[11] Patent Number: 5,420,193

[45] Date of Patent: May 30, 1995

[54] HEAVY DUTY VEHICLE PNEUMATIC TIRES

[75] Inventors: Akihiko Matsue, Tokyo; Toru Ohtake, Niiza, both of Japan

[73] Assignee: Bridgestone Corporation, Tokyo, Japan

[21] Appl. No.: 124,228

[22] Filed: Sep. 21, 1993

[30] Foreign Application Priority Data

Sep. 29, 1992 [JP] Japan .................. 4-282169
Sep. 3, 1993 [JP] Japan .................. 5-242168

[51] Int. Cl.$^6$ ............. C08L 7/00; C08L 9/00; B60C 1/00
[52] U.S. Cl. ............... 524/495; 525/236; 525/237; 525/192; 525/194; 152/209 R
[58] Field of Search ........... 525/237, 236, 194, 192; 152/209 R; 524/495

[56] References Cited

U.S. PATENT DOCUMENTS

| | | | |
|---|---|---|---|
| 4,220,564 | 9/1980 | Tanimoto et al. | 525/237 |
| 4,274,462 | 6/1981 | Ogawa et al. | 525/236 |
| 4,396,052 | 8/1983 | Ahagon et al. | 525/236 |
| 4,721,749 | 1/1988 | Odar et al. | 525/236 |
| 4,790,365 | 12/1988 | Sandstrom et al. | 525/237 |
| 4,914,147 | 4/1990 | Mouri et al. | 525/237 |

FOREIGN PATENT DOCUMENTS 56-090843  7/1981  Japan .................. 525/236

*Primary Examiner*—Carman J. Seccuro, Jr.
*Attorney, Agent, or Firm*—Sughrue, Mion, Zinn, Macpeak & Seas

[57] ABSTRACT

A heavy duty vehicle pneumatic tire comprising a tread, wherein the tread is composed of a diene-based rubber composition, and crystalline syndiotactic-1,2-polybutadiene is incorporated into said rubber composition in an amount of 5 to 60 parts by weight relative to 100 parts by weight of a diene-based rubber component of the rubber composition. The syndiotactic 1,2-polybutadiene has a melting point of 130° to 170° C., an average particle diameter of not more than 100 μm, and a ratio of a major axis to a minor axis (L/D) being not more than 3. The content of 1,2-structural units in the syndiotactic-1,2 polybutadiene is not less than 75% by weight, and a syndiotacticity of the 1,2-structural units is not less than 75%.

6 Claims, No Drawings

HEAVY DUTY VEHICLE PNEUMATIC TIRES

BACKGROUND OF THE INVENTION

(1) Field of the Invention

The present invention relates to pneumatic tires for heavy vehicles. More particularly, the invention relates to pneumatic tires for trucks and buses as well as pneumatic tires for construction vehicles which are to be used on roads liable to cause exterior damages, such as bad roads or construction sites.

(2) Related Art Statement

As to heavy vehicle pneumatic tires to be used on roads liable to cause exterior damages, such as bad roads or construction sites, durability is particularly important as their performance. In order to improve durability, it is indispensable to improve cut resistance, cut-penetrating resistance, heat generation resistance and wear resistance of the tread. In order to improve the cut resistance and the cut-penetrating resistance of the tread, it is generally considered advisable to increase hardness of rubber. Therefore, hardness of the rubber has been conventionally increased by adding carbon black at a highly filled degree or by enhancing a cross-linked density through increasing an amount of sulfur.

However, when carbon black is added at a highly filled degree or the amount of sulfur is increased, elongation of the rubber is decreased. In this case, if the tread is cut at an angle near in parallel to the road, a phenomenon generally called pitching that a rubber piece is peeled from the tread due to growth of the cut is likely to occur. For this reason, wear resistance is deteriorated, and durability cannot be assured for a long time.

Under the circumstances, in order to increase hardness of rubber while maintaining elongation of the rubber, there have been proposed many technical countermeasures. For example, a thermoplastic resin is blended into a rubber composition. However, these countermeasures suffered deterioration in a heat generation characteristic, and could not afford intrinsic durability. Thus, it is an actual situation that sufficient effects could not be necessarily obtained by these countermeasures.

SUMMARY OF THE INVENTION

In view of the above, it an object of the present invention to improve cut resistance, cut-penetrating resistance, low heat generation characteristic and wear resistance in the case of pneumatic tires for heavy vehicles, without deteriorating chipping resistance. Particularly, since pneumatic radial tires for construction vehicles may be sometimes run at a high speed for a long period of time similarly to truck and bus pneumatic tires, it is important to improve low heat generation characteristic so as to prevent destruction of the tire due to build-up of heat inside the tire.

In order to realize both cut resistance and cut-penetrating resistance and chipping resistance in the tread of the pneumatic tire for the heavy vehicle, it is necessary to increase hardness of the rubber while maintaining elongation of the rubber. In view of this, the present inventors noticed cut-forming tendency and dependency upon temperature of hardness of rubber, and made strenuous investigations therefor. As a result, the inventors have discovered that both hardness and elongation of rubber suited for exhibiting the above performances can be realized by specifying hardness at a temperature exhibiting a closest correlationship to cut resistance and cut-penetrating resistance and also clarifying elongation at a temperature exhibiting a closest correlationship to chipping resistance. Further, the present inventors clarified that there is correlationship between wear resistance and chipping resistance under special conditions in the case of the heavy vehicle pneumatic tire such as the tire for construction vehicle. Based on these results, the present inventors further repeatedly made strenuous investigations, and consequently discovered a rubber composition for a tread capable of attaining the above object and accomplished the present invention.

That is, the heavy vehicle pneumatic tire according to the present invention includes a tread composed of a specific rubber composition. This rubber composition is composed of a diene base rubber component and syndiotactic-1,2-polybutadiene (hereinafter referred to as "syn-1,2PB"), the content of the syn-1,2PB being 5 to 60 parts by weight relative to 100 parts by weight of the diene base rubber component. This syn-1,2PB is a crystalline syn-1,2PB characterized in that the content of 1,2-structural units is 75% by weight or more, and syndiotacticity of the 1,2-structural units is not less than 75%, and the syn-1,2PB has a melting point in a range of 130° C. to 170° C. the average particle diameter of not more than 100 $\mu$m, and a ratio of a major axis/a minor axis (L/D) being not more than 3.

The above syn-1,2PB is preferably blended in an amount of 10 to 35 parts by weight relative to 100 parts by weight of the diene base rubber component.

Further, in order to improve low heat generation characteristic, it is preferable that 35 to 50 parts by weight of carbon black having a nitrogen adsorption specific surface area ($N_2SA$) of not less than 90 $m^2/g$ is blended relative to 100 parts by weight the rubber composition. It is preferable that 35 to 44 parts by weight of carbon black having a nitrogen adsorption specific surface area ($N_2SA$) of not less than 110 $m^2/g$ is blended relative to 100 parts by weight of the rubber composition (the diene base rubber component). The $N_2SA$ value is a value measured according to ASTM D3037-84B. The syndiotacticity of the 1,2-structural units is preferably not less than 85%. Further, the average particle diameter of the syndiotactic-1,2-polybutadiene is preferably not more than 50 $\mu$m.

These and other objects, features and advantages of the invention will be appreciated upon reading of the following description, with the understanding that some modifications, variations and changes of the same could be easily made by the skilled person in the art to which the invention pertains without departing from the spirit of the invention or the scope of claims appended hereto.

DETAILED DESCRIPTION OF THE INVENTION

The syn-1,2PB employed in the present invention will be produced by an appropriate process as disclosed in Japanese patent publication No. 53-39,917, 54-5,436 or 56-18,005. However, the polymerization process of the syn-1,2PB are not particularly limited to any of such disclosed ones. As a catalyst for polymerizing the above syn-1,2PB, a catalyst system may be recited, which is composed of carbon disulfide, one selected from the group consisting of a soluble cobalt compound such as cobalt octoate, cobalt-1-naphthenate or cobalt benzoate, and an organic aluminum compound such as trimethyl aluminum, triethyl aluminum, tributyl aluminum, or triphenyl aluminum.

A way of mixing the rubber composition according to the present invention is not limited to any specific method. Similar effects may be obtained by a wet blending process in a solvent or a dry blending process with a Banbury mixer or the like.

As the rubber component of the rubber composition according to the present invention, use may be made of diene base rubbers such as natural rubber, polyisoprene rubber, polybutadiene rubber, and stylenebutadiene copolymer rubber, which may be employed singly or as a mixed rubber. As the mixed rubber, a mixed rubber of natural rubber and/or polyisoprene rubber and styrene butadiene copolymer rubber may be recommended.

As a matter of course, ordinarily blended compounding agents including an inorganic filler such as carbon black or silica, a softener such as aromatic oil or spindle oil, an antioxidant, a vulcanizer, a vulcanization accelerator and a vulcanization acceleration aid may be used upon necessity.

According to the heavy vehicle pneumatic tires, intended effects can be more excellently obtained when the rubber composition is so formulated that hardness (Hd) at $-20°$ C. of the tread is 74 to 95, hardness(Hd) at $25°$ C. of the tread is not less than 60, and elongation (Eb) at $100°$ C. of the tread is 550%.

The heavy vehicle pneumatic tire according to the present invention belongs to truck and bus pneumatic tires and construction vehicle tires specified in Section 2 (Truck and bus section) and Section 3 (Off-the-road section) of 1993 Year Book published by "The Tire and Rim Association Company" specifying the standard tire specifications in the United States of America.

The present invention favorably encompasses both the radial tires and bias tires. When the present invention is applied to a heavy duty pneumatic radial tire including a carcass toroidally extending between a pair of bead cores, a belt arranged around a radially outer peripheral side of the carcass and containing at least four plies of metal cords, and a tread arranged on a radially outer peripheral side of the belt, cut resistance, cut-penetrating resistance, low heat generation characteristic and wear resistance can be more excellently afforded to the radial tire without deteriorating chipping resistance as aimed at by the present invention, considering that chipping is generally likely to occur in the radial tire due to lessened enveloped effect upon the tread in the presence of the belt and the radial tire is run for a longer time period at a higher speed as compared with the radial tire.

The temperature which exhibits the closest correlation to cut resistance from the standpoint of hardness in the case of the tread of the heavy vehicle pneumatic tire is $-20°$ C., and when hardness (Hd) at this temperature is not less than 74, the number of cuts in a tire is largely reduced to exhibit desired cut resistance in the state that the tire is actually fitted to a vehicle. If hardness at $25°$ C. exceeds 95, the tire may be cracked under low temperature environment. Thus, hardness at $-20°$ C. of more than 95 is unfavorable. The hardness at $-20°$ C. is preferably 74 to 95.

On the other hand, the temperature which exhibits the closest correlationship to cut-penetrating resistance from the standpoint of hardness is $25°$ C. When hardness (Hd) at $25°$ C. of the tread is not less than 60, the number of penetrating cuts in a tire is largely reduced to exhibit desired cut-penetrating resistance in the state that the tire is actually fitted to a vehicle.

Chipping resistance has deepest correlationship to elongation at $100°$ C. When elongation (Eb) at $100°$ C. is not less than 550%, chipping is difficult to occur. Elongation at $100°$ C. is preferably 600%.

In addition, it is known that heat generation characteristic of the tread well corresponds to a tan $\delta$ value. In order to suppress heat generation, the tan $\delta$ at $100°$ C. of the tread is preferably set at not more than 0.3.

In the tread of the heavy vehicle pneumatic tire according to the present invention, a specified amount of the specific syn-1,2PB is incorporated into a diene based rubber as the rubber composition for the tread so that the above physical properties may be attained.

When the content of 1,2-structural units of the syn-1,2PB used in the present invention is not less than 75% and the syndiotacticity is not less than 75%, a desired hardness (Hd) can be obtained in a temperature range of $-20°$ C. to $25°$ C.

Further, if the melting point of the syn-1,2PB is less than $130°$ C. necessary hardness cannot be obtained. On the other hand, if the melting point is more than $170°$ C. the syn-1,2PB is not sufficiently dispersed or melted during vulcanization, so that firm bonds between the syn-1,2PB and the rubber cannot be obtained. Consequently, sufficient elongation (Eb) at $100°$ C. cannot be obtained.

Further, if the average particle diameter of the syn-1,2PB is more than 100 $\mu$m, the syn-1,2PB is not sufficiently dispersed and no sufficient elongation (Eb) cannot be obtained. Further, if the ration of a major axis/a minor axis (L/D) of syn-1,2PB is unfavorably more than 3, the rubber composition of the tread is likely to be oriented in a direction parallel to the road surface so that chipping may be likely to occur.

Furthermore, if the blended amount of the syn-1,2PB is less than 5 parts by weight relative to 100 parts by weight of the rubber component, necessary hardness cannot be obtained. On the other hand, if the blended amount is more than 40 parts by weight relative to 100 parts by weight of the rubber component, elongation (Eb) drops.

According to the rubber composition for the tread of the present invention, a given amount of specific carbon black is preferably blended for the following reason. That is, when the syn-1,2PB having the above properties is kneaded with this carbon black in the diene base rubber at a temperature not lower than the melting point of the syn-1,2PB, the syn-1,2PB is microscopically dispersed in the main polymer among the components to be blended and firm bonds are formed between the carbon black and the syn-1,2PB. Consequently, the problem that the deteriorated low heat generation characteristic which the conventional syn-1,2PB blended system suffered can be solved. In other words, if the syn-1,2PB is used in combination with carbon black having the nitrogen adsorption specific surface area (N$_2$SA) of not less than 90 m$^2$/g, the blended amount of carbon black can be reduced and heat generation can be suppressed to a lower level. For a similar reason, it is preferable that the nitrogen adsorption specific surface area (N$_2$SA) of carbon black is not less than 110 m$^2$.

Syndiotactic-1,2-PB which have been conventionally difficult to be favorably used in a tread, particularly a cap portion of the tread, of a tire because heat generation characteristics and wear resistance were deteriorated. However, when the specified amount of the specific syn-1,2PB having the above restricted properties is incorporated into the tread of the heavy vehicle pneumatic tire, chipping resistance, cut resistance, cut-penetrating resistance, low heat generation characteristic and wear resistance can be improved.

Next, the present invention will be explained in more detail with reference to examples and comparative examples.

In the following experiments, as the syn-1,2PB to be blended into a rubber composition for a tread of a pneumatic tire, syn-1,2PB polymers A through D having microstructures shown in Table 1 were used. The melting points given in Table 1 were measured at a heating rate of 10° C./min. starting from 20° C. under a flow rate of nitrogen being 20 ml/min. by using a differential thermal analysis meter (DSC 200) manufactured by SEIKO Co., Ltd.

TABLE 2

| compounding agent | part by weight |
| --- | --- |
| natural rubber (NR) | varied |
| styrene-butadiene rubber (SBR) | varied |
| syn-1,2PB | varied |
| carbon black (ISAF) | varied |
| aromatic oil | 5 |
| stearic acid | 2 |
| paraffin wax | 2 |
| antioxidant (Santoflex 13)[1] | 1 |
| ZnO | 4 |
| vulcanization accelerator (CZ)[2] | varied |
| vulcanization accelerator (DPG)[3] | varied |
| sulfur | varied |

[1] N-(1,3-dimethylbutyl)-N'-phenyl-p-phenylenediamine
[2] N-cyclohexyl-2-benzothiazol sulfenamide
[3] diphenylguanidine

TABLE 3

|  | blended amount (parts by weight) | | | | | | |
| --- | --- | --- | --- | --- | --- | --- | --- |
|  | NR | SBR | Syn-1,2PB (kind) | carbon black | vulcanization accelerator (CZ) | vulcanization accelerator (DPG) | sulfur |
| Comparative Example 1 | 100 | — | — | 45 (N220) | 1.0 | — | 2.0 |
| Example 1 | 100 | — | 10 (A) | 45 (N220) | 1.0 | — | 2.0 |
| Example 2 | 100 | — | 28 (A) | 5 (N220) | 1.0 | — | 2.0 |
| Example 3 | 100 | — | 28 (B) | 45 (N220) | 1.0 | — | 2.0 |
| Comparative Example 2 | 100 | — | — | 60 (N220) | 1.0 | — | 2.0 |
| Comparative Example 3 | 100 | — | 3 (A) | 45 (N220) | 1.0 | — | 2.0 |
| Comparative Example 4 | 100 | — | 10 (D) | 45 (N220) | 1.0 | — | 2.0 |
| Comparative Example 5 | 100 | — | 28 (C) | 45 (N220) | 1.0 | — | 2.0 |
| Example 4 | 100 | — | 15 (B) | 55 (N220) | 1.0 | — | 2.0 |
| Example 5 | 50 | 50 | 28 (A) | 45 (N220) | 1.0 | 0.5 | 2.0 |
| Comparative Example 6 | 80 | 20 | — | 45 (N220) | 2.5 | — | 2.5 |
| Example 6 | 70 | 30 | 20 (B) | 55 (N220) | 0.8 | — | 2.0 |
| Example 7 | 100 | — | 20 (B) | 60 (N220) | 1.0 | — | 1.0 |
| Example 8 | 50 | 50 | 20 (B) | 60 (N220) | 1.0 | 0.5 | 0.8 |
| Example 9 | 100 | — | 20 (B) | 55 (N234) | 0.8 | — | 1.0 |
| Comparative Example 7 | 100 | — | — | 45 (N110) | 1.0 | — | 2.0 |
| Example 10 | 100 | — | 10 (A) | 45 (N110) | 1.0 | — | 2.0 |
| Example 11 | 100 | — | 28 (A) | 40 (N110) | 1.0 | — | 2.0 |
| Example 12 | 100 | — | 10 (A) | 40 (N110) | 1.0 | — | 2.0 |
| Comparative Example 8 | 100 | — | — | 45 (N330) | 1.0 | — | 2.0 |
| Example 13 | 100 | — | 10 (A) | 45 (N330) | 1.0 | — | 2.0 |

TABLE 1

| Resin | A | B | C | D |
| --- | --- | --- | --- | --- |
| melting point (°C.) | 131 | 165 | 165 | 181 |
| average particle diameter (μm) | 32 | 20 | 120 | 40 |
| content of 1,2-structural units (%) | 83 | 86 | 86 | 91 |
| syndiotacticity | 100 | 100 | 100 | 100 |
| major axis/minor axis (ratio) | not more than 3 | not more than 3 | not more than 3 | not more than 3 |

Various rubber compositions for treads were prepared by using the syn-1,2PB polymers shown in Table 1 with compounding recipes given in Tables 2 and 3. The total amount of the rubber components in Tables 2 and 3 was set to 100 parts by weight. In Table 3, nitrogen adsorption specific surface areas ($N_2SA$) of N110, N220, N234 and N330 used are 143 m²/g, 119 m²/g, 118 m²/g and 82 m²/g, respectively.

Each of the rubber compositions having the blending recipes shown in Tables 2 and 3 was used in a tread of a tire, and construction vehicle pneumatic tires having a tire size of 18.00 R25 with a lug pattern were produced according to an ordinary method. Those tires were subjected to various measurements given blow.

1) Hardness (Hd)

A hardness (Hd) values were measured of temperatures of −20° C. and 25° C. according to Japanese Industrial Standard JIS-A.

2) Elongation Eb

An Elongation (Eb) value was measured at 100° C. according to Japanese industrial standard JIS-3.

3) Cut resistance and Cut-penetrating resistance

The tire fitted to an actual vehicle was repeatedly run on a road simulating a bad road, the number of cuts and the number of cut penetrating the tread and reaching the belt were counted after a given number of circulations.

4) Chipping resistance

Presence or absence of chipping was evaluated by visual observation.

5) tan δ

Tan δ was measured with use of a biscoelastic spectrometer (Type VES-F3) manufactured by IWAMOTO MANUFACTURING Co., Ltd. under the conditions: an initial load 160 g, a dynamic strain 2.0%, a frequency 52 Hz, and a temperature 100° C. The shape of a sampled rubber was 4.7 mm×2.0 mm×20 mm.

6) Heat Generation

The heated temperature of the tread of the tire was measured after 12 hour running under conditions: a load 11.3 t and a speed 16 km/hour. The lower the heated temperature, the better the result.

7) Wear resistance

A test tire was fitted to a construction vehicle, and was run on a concrete road in a test course at a given speed. Then, the depth of a remaining groove was measured, and a inversion of a measured value was taken by index. The greater the figure, the better the wear resistance.

Results obtained are shown in Table 4.

wear resistance were improved without deteriorating chipping resistance.

As having been explained above, according to the heavy vehicle pneumatic tire of the present invention, a specified amount of the specific syn-1,2PB is incorporated into the rubber of the tread, and hardness values (Hd) at −20° C. and 25° C. and elongation (Eb) at 100° C. are controlled to their respective ranges, cut resistance, cut-penetrating resistance, low heat generation characteristic and wear resistance are improved without deteriorating chipping resistance.

What is claimed is:

1. A heavy vehicle pneumatic tire comprising a tread, wherein said tread is composed of a rubber composition including a diene-based rubber component, and crystalline syndiotactic-1,2-polybutadiene is incorporated into said rubber composition, a mixing rate of said syndiotactic-1,2-polybutadiene being 5 to 60 parts by weight relative to 100 parts by weight of a diene-based rubber component, said syndiotactic 1,2-polybutadiene having a melting point of 130° to 170° C., an average particle diameter of not more than 100 μm, and a ratio of a major axis to a minor axis (L/D) being not more than 3,

TABLE 4

|  | hardness (Hd) −20° C./25° C. | Elongation (Eb) 100° C. | chipping | number of cuts | number of penetrating cuts | tan δ (100° C.) | temperature of tire tread | wear resistance (Index) |
| --- | --- | --- | --- | --- | --- | --- | --- | --- |
| Comparative Example 1 | 72/59 | 650 | not chipped | 22 | 5 | 0.20 | 103 | 100 |
| Example 1 | 82/65 | 684 | not chipped | 9 | 2 | 0.14 | 95 | 111 |
| Example 2 | 9573 | 710 | not chipped | 3 | 0 | 0.12 | 91 | 119 |
| Example 3 | 91/71 | 695 | not chipped | 4 | 0 | 0.14 | 95 | 121 |
| Comparative Example 2 | 78/70 | 500 | chipped | 4 | 0 | 0.27 | 100 | 80 |
| Comparative Example 3 | 72/62 | 660 | not chipped | 21 | 5 | 0.20 | 97 | 100 |
| Comparative Example 4 | 83/66 | 525 | chipped | 18 | 6 | 0.23 | 99 | 93 |
| Comparative Example 5 | 87/69 | 513 | chipped | 19 | 4 | 0.20 | 97 | 95 |
| Example 4 | 92/73 | 599 | not chipped | 2 | 0 | 0.20 | 103 | 107 |
| Example 5 | 95/68 | 631 | not chipped | 7 | 2 | 0.14 | 96 | 120 |
| Comparative Example 6 | 88/70 | 452 | chipped | 4 | 0 | 0.30 | 110 | 90 |
| Example 6 | 94/77 | 560 | not chipped | 1 | 0 | 0.20 | 103 | 115 |
| Example 7 | 76/63 | 600 | not chipped | 10 | 3 | 0.20 | 103 | 113 |
| Example 8 | 85/74 | 555 | not chipped | 1 | 0 | 0.24 | 106 | 17 |
| Example 9 | 74/61 | 590 | not chipped | 12 | 4 | 0.16 | 98 | 119 |
| Comparative Example 7 | 74/61 | 670 | not chipped | 20 | 3 | 0.27 | 100 | 105 |
| Example 10 | 82/62 | 700 | not chipped | 8 | 0 | 0.16 | 98 | 115 |
| Example 11 | 93/65 | 760 | not chipped | 4 | 1 | 0.10 | 88 | 128 |
| Example 12 | 81/61 | 750 | not chipped | 5 | 1 | 0.12 | 90 | 120 |
| Comparative Example 8 | 65/50 | 640 | not chipped | 30 | 8 | 0.11 | 87 | 90 |
| Example 13 | 73/52 | 670 | not chipped | 18 | 4 | 0.17 | 92 | 93 |

As is seen from Table 4, when hardness values (Hd) at −20° C. and 25° C. and elongation (Eb) at 100° C. fall in their respective ranges, cut resistance, cut-penetrating resistance, low heat generation characteristic and a content of 1,2-structural units of the syndiotactic-1,2 polybutadiene is not less than 75% by weight, and a syndiotacticity of the 1,2-structure units is not less than 75%.

2. The heavy vehicle pneumatic tire according to claim 1, wherein said mixing rate of said syndiotactic-1,2-polybutadiene is 10 to 35 parts by weight relative to 100 parts by weight of the diene-based rubber component.

3. The heavy vehicle pneumatic tire according to claim 1, wherein said rubber composition is a rubber composition in which carbon black having a nitrogen-adsorption specific surface area ($N_2SA$) of not less than 90 m$^2$/g is incorporated into said rubber composition in an amount of 35 to 50 parts by weight relative to 100 parts by weight of the diene-based rubber component.

4. The heavy vehicle pneumatic tire according to claim 1, wherein said rubber composition is a rubber composition in which carbon black having a nitrogen-adsorption specific surface area ($N_2SA$) of not less than 110 m$^2$/g is incorporated into said diene-based rubber composition in an amount of 35 to 44 parts by weight to 100 parts by weight of the diene-based rubber component.

5. The heavy vehicle pneumatic tire according to claim 1, wherein said tread has a tan $\delta$ at 100° C. being not more than 0.3.

6. The heavy vehicle pneumatic tire according to claim 1, wherein said tread has a hardness (Hd) at −20° C. being 74 to 95, a hardness Hd at 25° C. being not less than 60, and an elongation at 100° C. being not less than 550%.

* * * * *